No. 857,484. PATENTED JUNE 18, 1907.
H. S. RANKIN.
VALVE.
APPLICATION FILED MAY 17, 1906.

WITNESSES

INVENTOR
HIRAM S. RANKIN.
BY
ATTORNEYS

UNITED STATES PATENT OFFICE.

HIRAM S. RANKIN, OF CRIPPLE CREEK, COLORADO, ASSIGNOR, BY DIRECT AND MESNE ASSIGNMENTS, TO THE RANKIN LUBRICATING VALVE CO., OF CRIPPLE CREEK, COLORADO, A CORPORATION OF COLORADO.

VALVE.

No. 857,484.  
Specification of Letters Patent.  
Patented June 18, 1907.

Application filed May 17, 1906. Serial No. 317,316.

*To all whom it may concern:*

Be it known that I, HIRAM S. RANKIN, a citizen of the United States, and a resident of Cripple Creek, in the county of Teller and State of Colorado, have made certain new and useful Improvements in Valves, of which the following is a specification.

This invention is a cock or valve particularly adapted for use as a throttle valve in a pipe line adjacent or leading to a rock drill or the like, employing fluid pressure such as compressed air or steam. But the valve is not limited to such use, as it may be employed in various places, in fact anywhere an angle valve is used, especially on lines transmitting considerable pressure.

In addition to its functions as a valve, the invention combines therewith the function of a lubricator, acting under the pressure of the line or system to force oil to the working surfaces of the valve and also into the pipe and thence to the machine or device operated by the fluid.

A further object or result of the invention is to produce an improved self-seating valve which will not leak, and which receives the fluid pressure internally in both open and closed positions so that there is no danger of collapsing the plug by pressure on the outer surface thereof, which is a defect incident to ordinary plug valves having outside pressure only, when closed.

The valve herein disclosed is also provided with adjusting means to prevent sticking or difficult manipulation, which is a point which also has to be considered with valves controlling heavy pressure.

Further features of the valve are its compactness and protection from injury, and a construction which allows a free flow through the plug when open; also a swiveling connection with the delivery hose or pipe, allowing it to swing to any position without leak.

The invention is illustrated in the accompanying drawings, in which—

Figure 1:
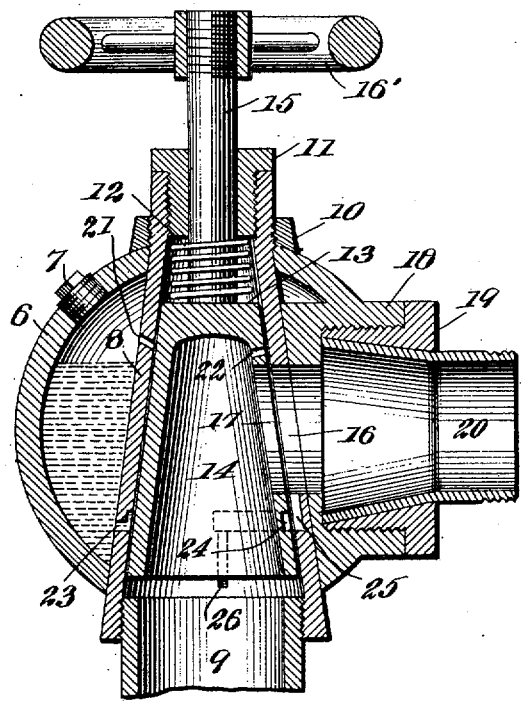
Figure 2:
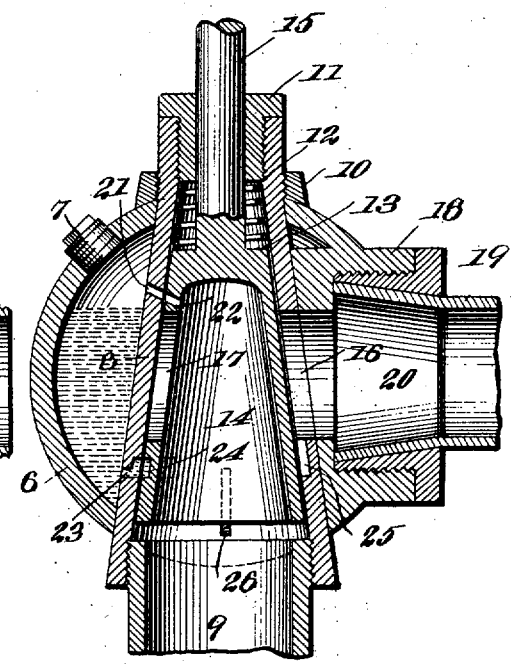
Figure 3:
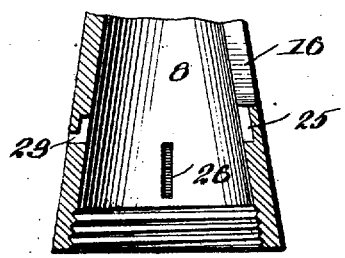
Figure 4:
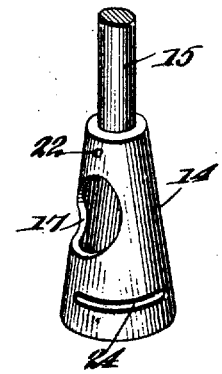

Figure 1 is a central vertical section of the valve, the plug or valve proper being adjusted to open the passage. Fig. 2 is a similar section with valve closed. Fig. 3 is a sectional view of the lower portion of the barrel or casing in which the plug works. Fig. 4 is a perspective view of the plug.

6 indicates a hollow globular casing which holds the oil and serves to inclose and protect the valve parts. It may have a filling hole closed by a screw plug 7. Extending diametrically through this globe is the tapered or frusto-conical valve barrel 8, the lower or larger end of which is interiorly threaded to receive the inlet pipe 9. The upper or smaller end is threaded externally where it projects through the casing, to receive a lock nut 10 whereby it is held in place in the casing, the lock nut bearing upon the exterior surface of the globe. It is also threaded internally in said projecting small end, to receive a jam bushing 11 which screws against the end of a spiral spring 12 which forms a cushion between the bushing and an annular shoulder 13 on the valve plug 14. The jam bushing serves to adjust or limit the pressure or frictional contact of the plug against the barrel.

The hollow plug 14 is tapered to fit the barrel, and is open at its larger end to the flow from the inlet pipe 9. The valve stem 15 extends from the small end of the plug through the bushing 11 and is provided with a handle 16' whereby it may be turned. Both the barrel 8 and the plug 14 have lateral openings 16 and 17 which by the operation of the plug are either opened or closed to start or stop the flow.

Cast integral with the globe 6 is the female member 18 of the outlet pipe union, into which the opening 16 leads. The inner face of this member is shaped to form a tight joint against the outer surface of the barrel 8, around the hole 16, and said member is internally threaded to receive the reamed bushing 19 which fits over the swaged or flared end of the outlet pipe or nipple 20 to which the delivery hose is attached, leading to the drill or other machine. This allows the nipple to swivel in the joint, the integral pressure preventing leak.

The barrel 8 has a drilled port 21, and the plug 14 a drilled port 22 which register when the valve is closed. These ports are located to open into the top of the globe or casing above the oil, so that when the valve is closed the oil receives the pressure in the line. Near the bottom of the casing the barrel has another port 23 which, when the valve is closed, opens into one end of a segmental groove 24 formed in the outer surface of the plug 14. This groove is of proper length to communicate at its other end, when the valve is open, with a passage 25 formed in the inner surface of the barrel 8 and leading upwardly to the outlet opening 16, and also with a passage 26 formed in barrel 8—see Fig. 3—at a point a little nearer the passage 25 than passage 23, and extending below the end of plug 14, as shown in Figs. 3 and 4, so that air has access to it at all times.

The operation of the valve is similar in general to that of any angle cock. As to the lubricating feature, when the valve is closed the port 22 registers with the port 21 as shown in Fig. 2. and admits air into the globe 6 above the oil. The port 23 then also registers with the groove 24 in plug 14, and oil is thus forced by air pressure into said groove. When the valve is opened, as shown in Fig. 1, the ports 22, 21, and 23 are closed, and the groove 24 connects the passages 25 and 26, so that the oil in the groove passes out into the delivery pipe 20. The oil also finds its way to and between the surfaces of the barrel and plug, thus lubricating the same.

The pressure on the plug is internal, both when the valve is open and closed. The valve is self seating and packing, in consequence of its tapered shape and the action of the spring 12. Adjustment of the bushing 11 prevents sticking and difficult action, by easing the pressure on the plug, with the yielding action of the spring 12. The valve and lubricator are combined in a compact form, and the former is protected by the outer casing from injury incident to rough usage.

I claim—

1. The combination, with a hollow casing adapted to contain oil, of a valve proper inclosed thereby and having ports which communicate to admit pressure into the oil chamber when the valve is closed, and having a passage which communicates with the said chamber when the valve is closed and with the interior of the valve when it is open, as described.

2. The combination, with a casing adapted to contain oil and having a lateral opening, of a tapered barrel 8 which extends through the walls of the casing, a tapered valve arranged rotatably in said barrel and fitted thereto, both valve and barrel being provided with openings at the side and bottom, and means for securing the valve in the barrel, substantially as described.

3. The combination with a casing adapted to contain oil, of an angle cock which is located within the casing, comprising a barrel and a hollow turning plug therein, the barrel and plug having ports which are located near the top of the casing and register when the valve is closed, to admit pressure into the casing, the plug having also a segmental groove in the outer surface thereof, and the barrel having a port which opens at the bottom of the casing and registers with the groove when the valve is closed and also having a passage 25 which opens into the main way of the valve and another 26 that registers with the groove in the plug when the same is open.

H. S. RANKIN.

Witnesses:
E. O. SMITH,
THOS. J. BARBIE.